May 17, 1960    J. F. GRUNBERG    2,936,593
PROCESS FOR THE PRODUCTION OF AMMONIA SYNTHESIS GAS
Filed April 26, 1957
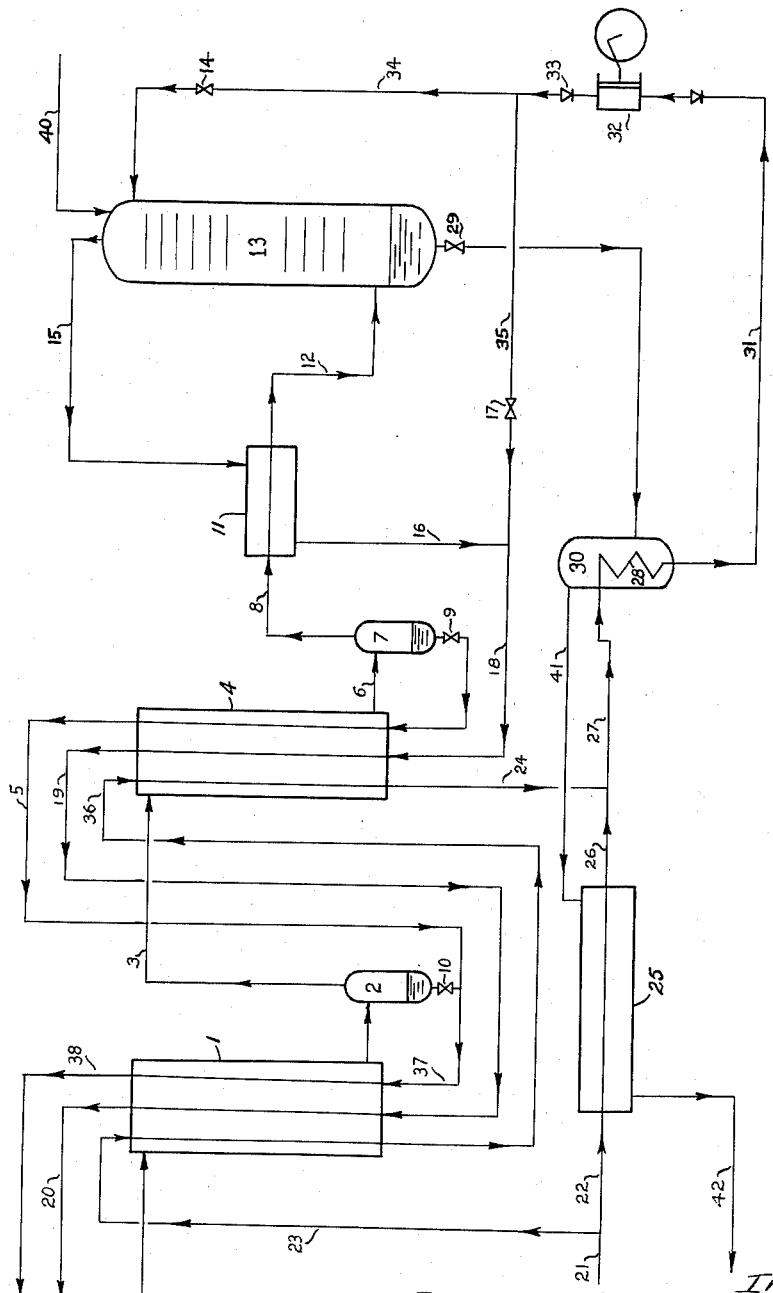
Inventor
JACQUES F. GRUNBERG
By *Alan Aumabey*
Attorney

2,936,593
PROCESS FOR THE PRODUCTION OF AMMONIA SYNTHESIS GAS

Jacques F. Grunberg, Outremont, Quebec, Canada, assignor to L'Air Liquide, Societe Anonyme pour l'Etude et l'Exploitation des Procedes Georges Claude, Paris, France, a body politic and corporate Application April 26, 1957, Serial No. 655,413

Claims priority, application France April 27, 1956

6 Claims. (Cl. 62—20)

The present invention relates to a process for the production of ammonia synthesis gas.

Low temperature processes have been developed for the production of ammonia synthesis gas. These processes treat various gaseous mixtures, containing a fairly high percentage of hydrogen, such as coke-oven gas, refinery gases, gases obtained through partial oxidation of natural gas and various hydrocarbons. After carbon dioxide removal and drying, the feed gases under pressure are progressively liquefied—the heavier fractions being condensed and revaporized at low pressure, in order to supply a part of the refrigeration necessary for the cooling and condensation of the feed gas. When the feed gas is purified to the extent that only relatively light impurities, nitrogen, carbon monoxide, methane, oxygen and argon are left with the hydrogen, a final purification step is often carried out through liquid nitrogen scrubbing. The liquid nitrogen scrubbing reduces the impurity contents in the hydrogen to very low values such as 10 p.p.m. of CO in the synthesis gas. Where liquid nitrogen scrubbing is not used and the ammonia synthesis process can run with higher impurities, liquid nitrogen can also be added to the mixture, in order to provide the necessary refrigeration at very low temperature levels.

In the conventional ammonia synthesis gas purification plants, the nitrogen which is generally produced by an air separation plant is always compressed to a pressure higher than the synthesis gas pressure, in order to be able to mix the nitrogen with the hydrogen, and to supply nitrogen at a higher pressure than the working pressure of the scrubbing columns. When liquid-nitrogen scrubbing is used in the process, the compressed nitrogen is divided into three fractions: the first fraction is used for the scrubbing, as liquid, and supplied to the top of the liquid nitrogen scrubbing column; the second fraction is used for cold nitrogen make-up, whereby the liquid-nitrogen is vaporized in a hydrogen stream and vaporized at a relatively lower temperature than the temperature, which could be obtained by vaporizing pure liquid at this pressure. The third fraction is generally used as warm make-up outside of the low temperature unit, where it is added to the purified hydrogen-nitrogen stream.

It is the purpose of the present invention to develop processes in which appreciable savings can be made in the production of ammonia synthesis gas.

It is well known that the free energy of a gas mixture is approximately the sum of the free energy of its components at their partial pressure in the mixture. Considering the $N_2$—$3H_2$, ammonia synthesis mixture supplied for example from a low temperature unit after warm make-up at a pressure of 20 atmospheres absolute, the free energy of the mixture is equal to the sum of the free energy of hydrogen considered at a pressure of 15 atmospheres absolute, and the free energy of nitrogen at 5 atmospheres absolute.

On the other hand, if we consider gaseous hydrogen at 20 atmospheres and gaseous nitrogen at 20 atmospheres with a view of mixing these two gases in a stoichiometric proportion, the free energy of hydrogen is equal, before it is mixed with nitrogen, to the free energy at 20 atmospheres, whereas the free energy of nitrogen before combining this gas with hydrogen, is the free energy of nitrogen at the same pressure.

If we now mix hydrogen at 20 atmospheres with nitrogen at 20 atmospheres, the free energy of the mixture drops suddenly. Therefore, mixing pure gases at 20 atmospheres to combine them in a synthesis mixture is an irreversible operation. On the contrary, if gaseous hydrogen at low temperature is mixed with liquid-nitrogen at low temperature, the temperature at which the nitrogen vaporizes is appreciably lower than the temperature at which the nitrogen would vaporize at the same total pressure. In other words, when liquid-nitrogen is combined with the hydrogen, it is possible to condense nitrogen at a lower pressure than the pressure at which the nitrogen and the hydrogen are mixed. For example, if nitrogen and hydrogen are combined at 20 atmospheres, the partial pressure of nitrogen in the 75% hydrogen, 25% nitrogen mixture is approximately 5 atmospheres. The temperature at which such a mixture boils is roughly the temperature of boiling nitrogen under about 5 atmospheres absolute. In fact, if we progressively mix liquid-nitrogen with hydrogen, the boiling temperature of this mixture will not be constant, but depend on the concentration of nitrogen in the gaseous phase. By mixing liquid-nitrogen and hydrogen under a total pressure of 20 atmospheres absolute, it is therefore possible through indirect heat exchange, to condense pure nitrogen at pressures lower than the pressure of the synthesis mixture.

The main feature of the proposed invention is to liquefy nitrogen at a pressure lower than the pressure of the synthesis gas through indirect heat exchange with the outcoming product and waste streams and thereby to obtain appreciable savings on equipment and power.

Plants producing ammonia synthesis gas mixture can either be supplied with liquid-nitrogen produced by auxiliary means, such as liquid-nitrogen produced by an air separation plant or produce themselves the necessary refrigeration. In processes where refrigeration is supplied by external means, about 10% of the nitrogen consumed is delivered independently as liquid from an air separation plant. In this case, the major portion of the nitrogen will be compressed to a pressure approximately ⅓ of the synthesis gas pressure, then cooled and liquefied, finally compressed as a liquid to a pressure higher than that of the synthesis gas through a liquid pump which requires only a very small fraction of the power necessary to compress gaseous nitrogen to the same pressure.

In processes where the refrigeration is obtained through expansion of gaseous nitrogen within the synthesis gas unit, the proposed invention permits the expansion of gaseous nitrogen in expansion machines at pressure levels substantially lower than the pressure of the synthesis gas. The nitrogen is then liquefied and later compressed as a liquid.

The present invention will be more fully understood by referring to the accompanying drawing wherein—the figure illustrates a schematic view of a process for producing ammonia synthesis gas wherein the refrigeration is obtained from external means.

Referring particularly to the figure, it is assumed that the feed gas containing a high percentage of hydrogen enters the low temperature separation plant free from $CO_2$, $H_2S$ and water. The feed gas enters the warm end flange of heat exchanger 1, where it is cooled down by indirect heat exchange with the product synthesis gas and low pressure residual streams. An appreciable flow of nitrogen used for the separation and the make-up of the synthesis gas flows also in the same direction as the feed gas in a separate passage of heat exchanger 1. Leaving heat exchanger 1, after partial liquefaction of some heavier components, the feed gas then enters separator 2 where it is separated into a gaseous fraction leaving through pipe 3 and a liquid fraction expanded through valve 10. The fraction expanded through valve 10 is mixed with impurities condensed at lower temperatures and flowing in pipe 5.

The feed gas enters exchanger 4 through pipe 3 in the same direction as the nitrogen fraction which enters this exchanger through pipe 36. The feed gas and the nitrogen are further cooled by indirect heat exchange with the separated products. The feed gas leaves exchanger 4 through pipe 6, then enters separator 7 where it is separated into a gaseous fraction which leaves separator 7 through pipe 8 and a liquid fraction containing mainly hydrocarbons which leaves separator 7 through valve 9.

These hydrocarbons are expanded to about atmospheric pressure and reheated in a separate passage of heat exchanger 4. The hydrocarbons then flow through pipe 5. They are mixed with the hydrocarbon fraction expanded from valve 10 and enter a separate passage of heat exchanger 1 through pipe 37. Reheated in heat exchanger 1, the hydrocarbons leave the plant through pipe 38. The gaseous feed gas fraction leaving separator 7 through pipe 8 enters heat exchanger 11, where it is cooled down by indirect heat exchange with the hydrogen rich mixture leaving the top of the scrubbing column. The purified feed gas leaves exchanger 11 through pipe 12 and enters the liquid-nitrogen scrubbing column 13, where it is submitted to the purifying action of liquid-nitrogen fed to the top of this column through valve 14. A small amount of liquid-nitrogen is also supplied through pipe 40 from external means of refrigeration. Leaving the top of the scrubbing column 13 through pipe 15, the hydrogen rich mixture is reheated in heat exchanger 11 and leaves this exchanger through pipe 16. It is then combined with a liquid-nitrogen make-up delivered through valve 17. The combined mixture, hydrogen-nitrogen, enters a separate passage of heat exchanger 4 through pipe 18. The liquid-nitrogen is vaporized in the hydrogen stream in this separate passage. The combined mixture, nitrogen plus $3H_2$, leaves heat exchanger 4 through pipe 19 and is then reheated in heat exchanger 1 which it leaves at about 19 atmospheres through pipe 20.

Compressed nitrogen to about 7 atmospheres absolute is supplied to the plant through pipe 21. It then splits into two fractions which flow through pipes 22 and 23. The fraction which flows in pipe 23 is cooled down in heat exchanger 1 and heat exchanger 4, and then joins the second fraction through pipe 24. The second nitrogen fraction is cooled down by indirect heat exchange with the tower bottoms. The second nitrogen fraction entering heat exchanger 25 through pipe 22 leaves this exchanger through pipe 26 and joins the first nitrogen fraction which flows through pipe 24. The combined nitrogen stream enters a coil 28 through pipe 27. In coil 28, the nitrogen is further liquefied and sub-cooled by indirect heat exchange with liquid tower bottoms leaving column 13 through expansion valve 29. The liquid-nitrogen leaving coil 28 of vaporizer 30 through pipe 31 is at approximately 6 atmospheres absolute. It is then pumped through liquid pump 32 to approximately 22 atmospheres gauge and leaves this pump through pipe 33. It then splits into two fractions: the first fraction flowing in pipe 34 is expanded through valve 14 and supplied as reflux to the top of the liquid-nitrogen scrubbing column. The second fraction, flowing through pipe 35 is mixed to the hydrogen stream through valve 17. The liquid tower bottoms expanded through valve 29 are vaporized in heat exchanger 30 by indirect heat exchange with condensing nitrogen circulating in coil 28. The tower bottoms leave exchanger 30 through pipe 41 and, reheated in heat exchanger 25 by indirect heat exchange with part of the nitrogen, they leave the unit through pipe 42.

I claim:

1. In a process for producing ammonia synthesis gas in which impure hydrogen-rich feed gas stream under pressure is cooled, whereby its impurities are at least partly liquefied and separated therefrom, a nitrogen stream is cooled and liquefied under pressure, then vaporized into said purified hydrogen-rich gas stream, said liquid impurities are vaporized and warmed and said hydrogen-nitrogen gaseous mixture is warmed by heat exchange with said impure hydrogen-rich gas and nitrogen streams, the improvement of cooling and liquefying said nitrogen stream at a pressure lower than the pressure of said purified hydrogen-rich gas stream, then compressing the liquid nitrogen to a pressure at least as high as that of said purified hydrogen-rich gas stream.

2. A process according to claim 1, in which the purified hydrogen-rich gas stream is further purified by scrubbing with part of said liquid nitrogen.

3. A process for producing ammonia synthesis gas, comprising the steps of: cooling under pressure an impure hydrogen-rich gas stream and liquefying part of its impurities, further purifying said hydrogen-rich gas stream by scrubbing it with liquid nitrogen, cooling and liquefying a gaseous nitrogen stream under a pressure lower than that of said scrubbed hydrogen-rich gas stream, compressing said liquid nitrogen stream to a pressure at least as high as that of said scrubbed hydrogen-rich gas stream, dividing said liquid nitrogen stream into two parts, feeding a first part to said scrubbing operation, vaporizing a second part into said scrubbed hydrogen-rich gas stream, warming said hydrogen-nitrogen gaseous mixture by heat exchange with said impure hydrogen-rich gas and gaseous nitrogen streams, and expanding, vaporizing and warming said liquefied impurities and said scrubbing liquid loaded with impurities by heat exchange with said impure hydrogen-rich gas and nitrogen streams.

4. A process for producing ammonia synthesis gas, comprising the steps of: cooling under pressure an impure hydrogen-rich gas stream and liquefying part of its impurities, further purifying said hydrogen-rich gas stream by scrubbing it with liquid nitrogen, cooling and liquefying a gaseous nitrogen stream under a lower pressure than that of said purified hydrogen-rich gas stream, compressing said liquid nitrogen to a pressure higher than that of said scrubbed hydrogen-rich gas stream, dividing said liquid nitrogen stream into two parts, expanding a first part to the pressure of said scrubbed hydrogen-rich gas stream and feeding it to said scrubbing operation, expanding a second part to substantially the same pressure and vaporizing it into said scrubbed hydrogen-rich gas stream, feeding a supplemental liquid nitrogen stream to said scrubbing operation, warming said hydrogen-nitrogen gaseous mixture by heat exchange with said impure hydrogen-rich gas and nitrogen streams, and expanding, vaporizing and warming said impurities and said scrubbing liquid loaded with impurities by heat exchange with said impure hydrogen-rich gas and nitrogen streams.

5. A process for producing ammonia synthesis gas, comprising the steps of: cooling under pressure an impure hydrogen-rich gas stream and liquefying part of its impurities, further purifying said hydrogen-rich gas stream to a low carbon monoxide content by scrubbing it with liquid nitrogen, dividing a stream of gaseous nitrogen, under a pressure lower than that of said scrubbed hydrogen-rich gas stream, but higher than one fourth of the same, into a first part and a second part, cooling and liquefying both parts of said stream under the same pressure, compressing said liquid nitrogen stream to a pressure at least as high as that of said scrubbed hydrogen-rich gas stream, dividing said liquid nitrogen stream into two parts, feeding a first part to said scrubbing operation, vaporizing a second part into said scrubbed hydrogen-rich gas stream, feeding a supplemental liquid nitrogen stream to said scrubbing operation, warming said hydrogen-nitrogen mixture by heat exchange with said impure hydrogen-rich gas and said first part of said gaseous nitrogen stream, expanding, vaporizing and warming said liquefied impurities by heat exchange with the same, expanding and vaporizing said scrubbing liquid loaded with impurities by heat exchange with said cooled gaseous nitrogen stream, and warming said vaporized scrubbing liquid by heat exchange with said second part of said gaseous nitrogen stream.

6. A process according to claim 5, wherein said gaseous nitrogen stream is cooled and liquefied under a pressure about one third of the pressure of said scrubbed hydrogen-rich gas stream.

References Cited in the file of this patent

UNITED STATES PATENTS

| | | |
|---|---|---|
| 1,723,425 | Jaubert | Aug. 6, 1929 |
| 1,843,043 | Patart | Jan. 26, 1932 |
| 1,870,096 | Claude | Aug. 2, 1932 |
| 1,913,805 | Hausen | June 13, 1933 |